United States Patent [19]

Kondo

[11] 3,999,198
[45] Dec. 21, 1976

[54] DEVICE FOR CHECKING THE ROTATION OF A TAKE-UP SPOOL IN A CAMERA

[75] Inventor: Hidenobu Kondo, Yokohama, Japan

[73] Assignee: Nippon Kogaku K.K., Tokyo, Japan

[22] Filed: Oct. 28, 1975

[21] Appl. No.: 626,374

[30] Foreign Application Priority Data

Nov. 6, 1974 Japan ............... 49-133639[U]
Nov. 6, 1974 Japan ............... 49-133640[U]

[52] U.S. Cl. ........................... 354/212; 354/202
[51] Int. Cl.² ........................................ G03B 1/00
[58] Field of Search ............... 354/202, 212, 213

[56] References Cited

UNITED STATES PATENTS

| | | | |
|---|---|---|---|
| 2,241,122 | 5/1941 | Drotning | 354/213 X |
| 3,465,658 | 9/1969 | Hackenberg | 354/212 |
| 3,925,798 | 12/1975 | Sanada et al | 354/212 X |

Primary Examiner—John Gonzales
Attorney, Agent, or Firm—Fitzpatrick, Cella, Harper & Scinto

[57] ABSTRACT

In a camera having a film take-up spool rotatable by an advance gear train operatively associated with a film advance lever having a preparatory angle, there is provided a device for checking the rotation of the take-up spool which comprises a rotatable cam operatively associated with the film take-up spool and displaceable so as to assume a first position when the advance lever is in its retracted position and to assume a second position when the advance lever is pulled out beyond the preparatory angle, a lever operatively associated with the back cover of the camera and displaceable so as to assume a first position when the back cover is open and to assume a second position when the back cover is closed, and a checking member operatively associated with the cam and the lever to assume a position for restraining the advance gear train only when both of the cam and the lever assume their first positions and otherwise to assume a position for releasing the restraint.

7 Claims, 10 Drawing Figures

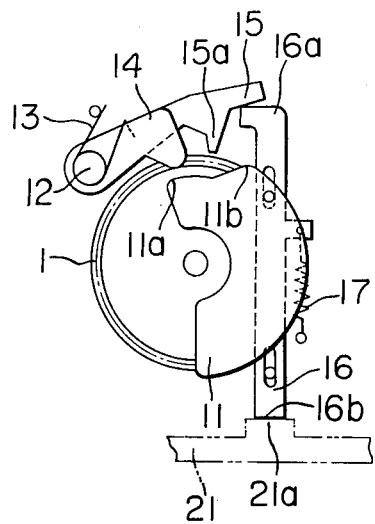
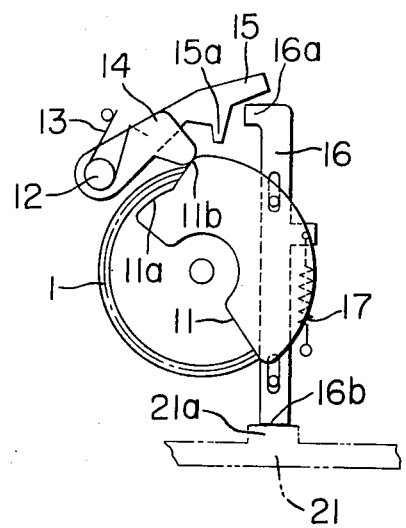
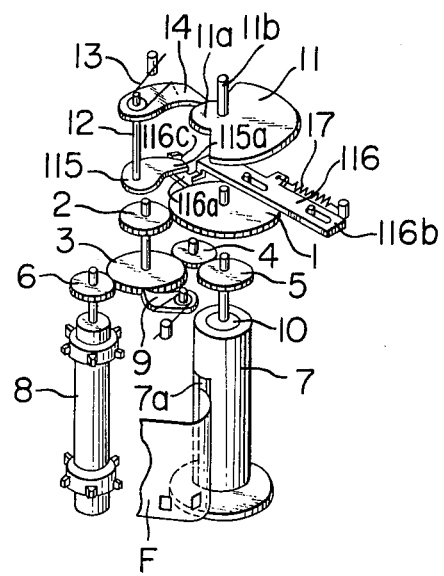

DEVICE FOR CHECKING THE ROTATION OF A TAKE-UP SPOOL IN A CAMERA

BACKGROUND OF THE INVENTION

1. Field of the Invention

This invention relates to a device for checking the rotation of a film take-up spool in a camera.

2. Description of the Prior Art

The leading end of a film roll may be inserted into a take-up spool (hereinafter simply referred to as a "spool") in the rotational direction of film advance (normal rotation) or in the rotational direction of film rewind (reverse rotation), but the insertion in the direction of reverse rotation may sometimes cause breakage of the film because the portion of the film which has been inserted is bent through an angle greater than 180° by the film advance operation. It is therefore desirable that the film be inserted in the direction of normal rotation.

However, in some cameras there is insufficient friction to retain the spool in position during film insertion in the direction of normal rotation, and in such cases the effort to insert the film into the spool will not be readily successful and will be hindered because the spool itself will effect normal rotation. For this reason, it has usually been the practice to hold the spool against rotation and insert the leading end of the film into the spool, but this is very awkward to do.

SUMMARY OF THE INVENTION

Accordingly, I contribute by the present invention means whereby I am able to overcome the foregoing difficulties and disadvantages. In so doing, I provide a device for checking the rotation of the spool during insertion of a film thereinto in order to permit the film to be simply inserted into the spool.

The present invention utilizes the fact that the film advance lever has a preparatory (or preliminary) angle throughout which the rotation of the lever is ineffective for effecting film advance, and it is designed such that the spool is prevented from rotating when the advance lever is in its retracted position, but is permitted to rotate when the advance lever is in its film advancing position (namely, when the advance lever is pulled out beyond the preparatory angle); and so that even when the advance lever is in its retracted position, the spool may be rendered rotatable when the camera's back cover is closed.

According to the present invention, there is provided, in a camera having a film take-up spool rotatable by an advance gear train operatively associated with a film advance lever having a preparatory angle, a device for checking the rotation of the take-up spool which comprises a first interlocking member operatively associated with the film take-up spool and displaceable so as to assume a first position when the advance lever is in its retracted position and to assume a second position when the advance lever is pulled out beyond the preparatory angle, a second interlocking member operatively associated with the back cover of the camera and displaceable so as to assume a first position when the back cover is open and to assume a second position when the back cover is closed, and a checking member operable to assume a restraining position for restraining the advance gear train and to assume a releasing position for releasing the restraint, the checking member being operatively associated with the first and the second interlocking member to assume the restraining position only when both of the first and second interlocking members assume their first positions and to assume the releasing position in the other cases.

The first interlocking member may be a rotatable cam which is rotatable in response to the rotation of the advance lever. The second interlocking member may be a lever which is operable in response to both the opening and closing of the back cover of the camera.

In an embodiment of the present invention, the checking member may comprise a first engaging portion formed so as to be engageable with the rotatable cam, a second engaging portion formed so as to be engageable with the lever, and a restraining portion engageable with the advance gear train to restrain the movement thereof.

In another embodiment of the present invention, the checking member may comprise a restraining member secured to the lever and engageable with the advance gear train to restrain the movement thereof, and an operating member engageable with the restraining member and operable by the rotatable cam.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification, wherein:

FIG. 4 is a plan view similar to that of FIG. 2 illustrating a position in which the advance lever is retracted with the back cover closed;

FIG. 5 is another plan view illustrating a position in which the advance lever is pulled out with the back cover closed;

FIG. 6 is a perspective view of a second embodiment of the film advance system;

DESCRIPTION OF THE PREFERRED EMBODIMENTS

Reference will first be had to FIGS. 1 to 5 to describe a first embodiment of the present invention.

Figure 1:
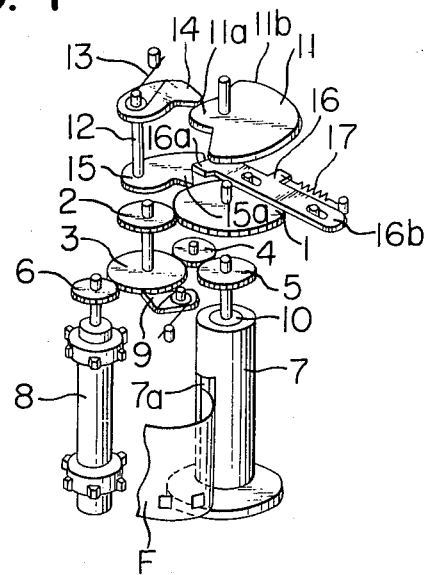
FIG. 1 is a perspective view of the film advance system according to one embodiment of the present invention.

In FIG. 1, a film advance gear train 1-6 is operatively associated with a film advance lever (not shown) to transmit normal rotation to a spool 7 and a sprocket 8. That is, the spool 7 is rotated in clockwise direction, as viewed, and the sprocket 8 in counter-clockwise direction. A film check pawl 9 is provided for checking the third gear 3 against counter-clockwise rotation with the aid of a known ratchet mechanism. I provide, between the fifth gear 5 and the spool 7, a known friction mechanism 10 for imparting a suitable degree of friction to the spool 7. A cam plate or first interlocking member 11 is operatively associated with the advance lever and has a camming surface 11a, 11b engageable by a change-over lever 14 which is biased by the clockwise biasing force of a spring 13 about a shaft 12 supported on a fixed portion of the camera body. A restraining lever 15 having a pawl 15a engageable with the first gear 1 is securely mounted on the shaft 12 in common with the change-over lever 14. The pawl 15a of the restraining lever 15 is such that it is in meshing engagement with the first gear 1 when the change-over lever 14 is engaged with the recessed portion 11a of the camming surface and that it is retracted out of engagement with the first gear 1 when the change-over lever 14 is engaged with the projected portion 11b of the camming surface. I also provided back-cover or second interlocking member 16 which is biased by a coil spring 17 in a direction to urge the back cover to open position and which has one end 16a engageable with the restraining lever 15 and the other end 16b engageable with the back cover (not shown). The back-cover interlocking member 16 assumes a first position when the back cover is open, and a second position when the back cover is closed. A film F has a leading end, only a portion of which is shown.

Figure 2:
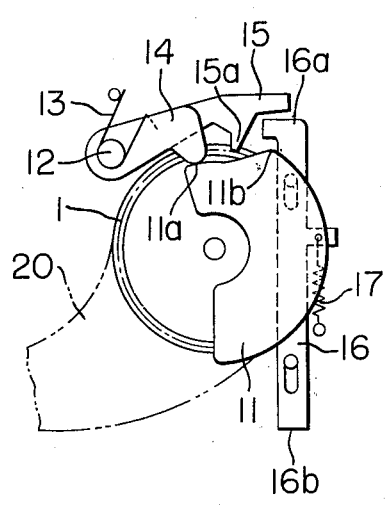
FIG. 2 is a plan view illustrating a position in which the advance lever is retracted when the back cover is open.
Figure 3:
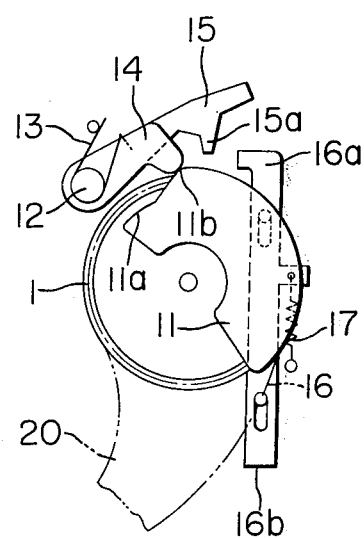
FIG. 3 is a view similar to FIG. 2 and illustrating a position in which the advance lever is pulled out with the back cover open.

FIGS. 2 and 3 show a position in which the back cover (not shown) is opened to insert the film. Actual insertion of the film F into the spool 7 is done with an advance lever 20 in its retracted position, as shown in FIG. 2. The cam plate 11 operatively associated with the advance lever 20 has its recessed portion 11a engaged with the change-over lever 14, and the pawl 15a of the restraining lever 15 operatively associated with the change-over lever 14 is in meshing engagement with the first gear 1. Thus, the advance gear train 1-6 is checked against rotation so that the spool 7 is held against rotation.

As a result, it becomes easy to cause the leading end portion of the film F to be nipped by the spool 7.

However, while the spool 7 is frictionally restrained by the friction mechanism 10, it will be rotatable by a strong rotational force imparted thereto.

In this matter, the spool 7 may be rotated so as readily to permit the groove 7a thereof to receive the film F.

Subsequently, in order to ensure engagement between the film perforations and the pawls of the sprocket 8, the film F is advanced by means of the advance lever 20 while the back cover is left open. FIG. 3 shows the position in which the advance lever 20 has thus been pulled out beyond its preparatory angle.

While the advance lever 20 is pulled out of its retracted position through the preparatory angle, engagement of the change-over lever 14 shifts from that with the recessed portion 11a to that with the projected portion 11b.

Thus, the change-over lever 14 is rotated counter-clockwise against the force of the spring 13, so that the restraining lever 15 is also rotated counter-clockwise with the change-over lever 14 to bring the pawl 15a out of engagement with the first gear 1. Therefore, as the advance lever 20 is further wound up, a film advance force is transmitted to the sprocket 8 through the gears 1-3 and 6 and likewise to the spool 7 through the gears 1-5, thus advancing the film F.

FIGS. 4 and 5 illustrate a position in which the back cover 21 (indicated by chain line) is closed, but with the advance lever 20 retracted in FIG. 4 and wound up in FIG. 5.

When the back cover 21 is closed with the advance lever 20 in its retracted position (FIG. 4), the projection 21a of the back cover forces one end 16b of the back-cover interlocking member 16 upwardly, as viewed, and into the second position, against the spring force of the coil spring 17. When this occurs, the other end 16a of the interlocking member 16 engages the tip end of the restraining lever 15 to rotate this lever in counter-clockwise direction, so that the pawl 15a of the lever 15 is retracted from the first gear 1 to permit rotation of the spool (designated by 7 in FIG. 1).

When the advance lever 20 is pulled out beyond its preparatory angle, the change-over lever 14 and the restraining lever 15 are rotated counter-clockwise by the cam plate 11 and lever 15 is brought out of engagement with the end 16a of the back-cover interlocking member 16, and it will be seen that this does not affect the releasing function for the spool in any way.

When the back cover 21 is closed with the advance lever 20 left in its pulled-out position (FIG. 3), the back-cover interlocking member 16 is only displaced from the first to the second position and the relation between the restraining lever 15 and the first gear 1 is not affected.

As seen in FIG. 5, the present embodiment is designed such that when the advance lever is wound up, the restraining lever 15 is rotated farther than when rotated by the back-cover interlocking member 16, but it will be apparent that this is not absolutely necessary.

It will also be apparent that the change-over lever 14 and the restraining lever 15 may be formed integrally with each other and the cam plate 11, as in the present embodiment, is not the only possible means for controlling their movements.

Reference will now be had to FIGS. 6 to 10 to describe the second embodiment of the present invention. Throughout these figures similar reference characters designate parts similar to those of the preceding Figures.

In FIG. 6, reference numeral 115 designates a release lever securely mounted on the shaft 12 in common with the change-over lever 14. The release lever 115 is movable with the change-over lever 14 and assumes a first position when the advance lever is in its retracted position and a second position when the advance lever is pulled out beyond its preparatory angle. A restraining lever 116, biased by the coil spring 17 in a direction to open the back cover (not shown), has one end 116a provided with a projection 116c engageable with one end 115a of the release lever 115 and the other end 116b engageable with the back cover. The pawl 116a of the restraining lever 116 is in meshing engagement with the first gear 1 when the back cover is open, and is retracted out of engagement with the first gear 1 when the back cover is closed.

Figure 7:
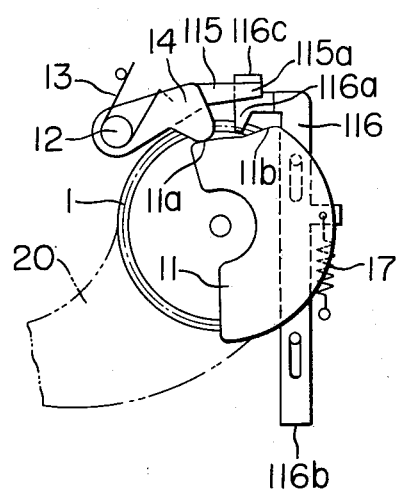
FIG. 7 is a plan view of the second embodiment illustrating a position in which the back cover is open with the advance lever retracted.
Figure 8:
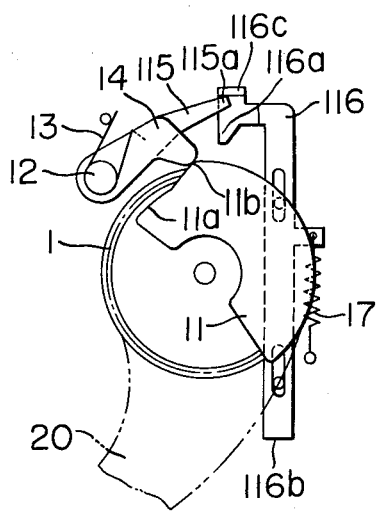
FIG. 8 is a plan view similar to that of FIG. 7 illustrating a position in which the back cover is open with the advance lever pulled out.

FIGS. 7 and 8 show a position in which the back cover is opened to insert a film roll, and in such position, the leading end of the film F is inserted into the spool 7, the advance lever 20 is in its retracted position, and the cam plate 11 has its recessed portion 11a engaged with the change-over lever 14. The restraining lever 116 is biased toward the back cover by the coil spring 17 so that the pawl 116a thereof is in meshing engagement with the first gear 1.

Thus, the advance gear train 1-6 shown in FIG. 6 is checked against rotation thereby to secure the spool 7 against rotation.

As a result, the leading end portion of the film F may easily be nipped by spool 7.

Subsequently, in order to ensure the engagement between the film perforations and the pawls of the sprocket 8, the film F is advanced by means of the advance lever 20 with the back cover left open. FIG. 8 shows the position in which the advance lever 20 has thus been pulled out beyond its preparatory angle.

While the advance lever 20 is pulled out of its retracted position through the preparatory angle, the engagement of the change-over lever shifts from that with the recessed portion 11a to that with the projected portion 11b.

Thus, the change-over lever 14 is rotated counter-clockwise against the force of the spring 13, so that the release lever 115 is also rotated counter-clockwise with the change-over lever 14 and into the second position. When this occurs, one end 115a of the release lever 115 engages the projection 116c of the restraining lever 116 to bias the latter lever upwardly as viewed in FIG. 8, thus bringing the pawl 116a out of engagement with the first gear 1. Therefore, as the advance lever 20 is further wound up, a film advance force is transmitted to the sprocket 8 through the gears 1-3 and 6 and likewise to the spool 7 through the gear train 1-5, thus advancing the film F.

Figure 9:
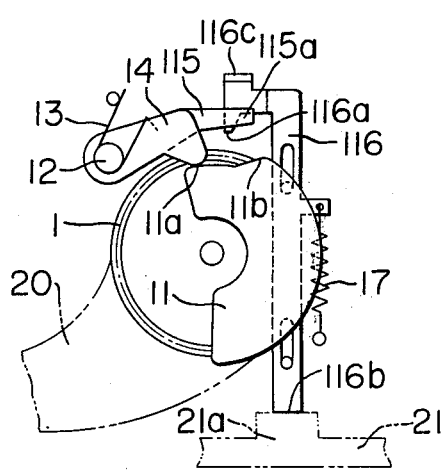
FIG. 9 is similar to FIG. 7 but shows a position in which the back cover is closed with the advance lever retracted.
Figure 10:
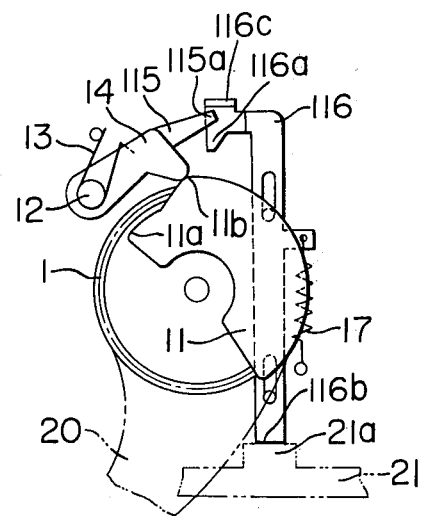
FIG. 10 is a plan view similar to FIG. 7 but showing a position in which the back cover is closed with the advance lever pulled out.

FIGS. 9 and 10 show a position in which the back cover (indicated by chain lines) is closed, but with the advance lever 20 retracted in FIG. 9 and wound up in FIG. 10.

When the back cover 21 is closed with the advance lever in its retracted position (FIG. 7), the projection 21a of the back cover forces one end 116b of the restraining lever 116 upwardly, as viewed in the figure, against the spring force of the coil spring 17. Thus, the pawl 116a is retracted from the first gear 1 to permit rotation of the spool 7.

When the advance lever 20 is pulled out beyond its preparatory angle, the change-over lever 14 and the release lever 115 are rotated counter-clockwise by the cam plate 11, but the tip end 115a of the release lever 115 is maintained at a position shortly out of engagement with the projection 116c of the restraining lever 116, thus affecting the restraining lever 116 in no way.

When the back cover 21 is closed with the advance lever 20 left in its pulled-out position (FIG. 8), the projection 116c of the restraining lever 116 is brought out of engagement with the tip end 115a of the release lever 115, whereas this does not affect the relation between the first gear 1 and the restraining lever 16.

According to the present embodiment, wherein the release lever 115 does not engage the projection 116c of the restraining lever 116 even if the advance lever 20 is pulled out with the back cover 21 left closed, there is no need to exert any excess force for moving the restraining lever 116 against the force of the coil spring 17 each time the film is to be advanced.

The change-over lever 14 and the release lever 115 may be formed integrally with each other and the cam plate 11, as in the present embodiment, is not the only possible means for controlling their movements.

From the foregoing description it will be seen that free rotation of the take-up spool during insertion of a film thereinto may be checked by a simple operation, thus enabling the film to be inserted simply.

Further, the spool becomes rotatable once the back cover is closed and thus, an autowinder (automatic film advance device) or the like becomes usable with the advance lever remaining in its retracted position.

It will also be appreciated that the anti-rotation check against the spool may be released also by wind-up of the advance lever, and this results in elimination of the need to effect a separate operation for releasing the anti-rotation check in order to advance the film.

I believe that the construction and operation of my novel device for checking the rotation of a take-up spool in a camera will now be understood and that the advantages thereof will be fully appreciated by those persons skilled in the art.

I claim:

1. In a camera having a film take-up spool rotatable by an advance gear train operatively associated with a film advance lever having a preparatory angle, a device for checking the rotation of the take-up spool comprising:
  a. a first interlocking member operatively associated with said film take-up spool and displaceable so as to assume a first position when said advance lever is in its retracted position and to assume a second position when said advance lever is pulled out beyond said preparatory angle;
  b. a second interlocking member operatively associated with the cover of the camera and displaceable so as to assume a first position when said cover is open and to assume a second position when said cover is closed; and
  c. a checking means operable to assume a restraining position for restraining said advance gear train and to assume a releasing position for releasing the restraint, said checking means being operatively associated with said first and second interlocking members to assume said restraining position only when both of said first and second interlocking members assume their first positions and otherwise to assume said releasing position.

2. A device according to claim 1, wherein said first interlocking member is a rotatable cam rotatable in response to the rotation of said advance lever.

3. A device according to claim 1, wherein said second interlocking member is a lever operable in response to the opening-closing of said cover.

4. A device according to claim 3, wherein said checking means comprises:
  a first engaging portion formed so as to be engageable with said first interlocking member
  a second engaging portion formed so as to be engageable with said lever; and
  a restraining portion engageable with said advance gear train to restrain the movement thereof.

5. A device according to claim 4, wherein said first interlocking member is a rotatable cam rotatable in response to the rotation of said advanced lever.

6. A device according to claim 3, wherein said checking means comprises:
   a restraining member secured to said lever and engageable with said advance gear train to restrain the movement thereof; and
   an operating member engageable with said restraining member and operable by said first interlocking member 7. A device according to claim 6, wherein said first interlocking member is a rotatable cam rotatable in response to the rotation of said advance lever.

* * * * *